May 11, 1926.

C. MORTENSEN

MILK PASTEURIZING APPARATUS

Filed March 12, 1925  3 Sheets-Sheet 1

1,583,851

Inventor
C. Mortensen,

WITNESSES:-

By

Attorney

May 11, 1926.

C. MORTENSEN

MILK PASTEURIZING APPARATUS

Filed March 12, 1925

WITNESSES:

Inventor
C. Mortensen,
By
Attorney

Patented May 11, 1926.

1,583,851

UNITED STATES PATENT OFFICE.

CORNELIUS MORTENSEN, OF LOUISVILLE, KENTUCKY.

MILK-PASTEURIZING APPARATUS.

Application filed March 12, 1925. Serial No. 15,126.

This invention relates to an apparatus for handling milk, and more particularly to a novel and improved holder for maintaining the milk at the required Pasteurizing temperature for the proper period of time.

To properly Pasteurize milk, the same must be maintained at a temperature of 142° to 145° for a period of thirty minutes, and this period of treatment must be accurately maintained while the temperature of the milk must be preserved to within one or two degrees of the Pasteurizing temperature for the full Pasteurizing period. Also, it is necessary to provide an apparatus that will automatically handle the milk without danger to improperly Pasteurized milk mingling with that which has been held in the machine for the required period. In other words, it is essential that the milk which has been heated but not held for the required period be kept out of contact with the milk that has been properly Pasteurized.

Accordingly, in view of the foregoing essential considerations for an apparatus of this character, the present invention contemplates a rotatably mounted receptacle having a plurality of holding compartments or tanks constructed and arranged in a novel manner and provided with a cover which permits access to the tanks for cleaning and sterilizing, the said cover being held stationary while the receptacle rotates, and carrying therewith the means for filling the tanks. In connection with the construction of the receptacle it may be pointed out that it is one of the objects to so construct the tanks that in event of accidental stopping of the movement of the receptacle milk will not overflow from one tank into the other but will flow to waste, thereby avoiding the mixing of milk in adjacent tanks, no two of which, of course, contain milk having the same degree of treatment.

Another object of the invention is to provide novel means for emptying the tanks automatically at a discharging station, thereby insuring the proper emptying of the tanks at the end of the Pasteurization period. To that end, the invention includes a novel automatic valve that is positive and reliable in its operation and is also susceptible of being readily taken apart after each period of use for sterilization It is also a feature of the means for emptying the tanks that the timing of the discharge be absolutely accurate or fixed, and to that end it is proposed to mount the means for operating the outlet valves on the base or like part of the apparatus rather than on the receiver for the Pasteurized milk.

A further object of the invention is to provide a novel receiver for the Pasteurized milk, the same having special features of construction which prevent splashing or foaming of the milk, and which is also properly covered thereby to prevent contamination of the Pasteurized milk as it passes into the receiver prior to being conveyed to the cooler.

A still further object of the invention is to provide an apparatus of the type set forth possessing structural features and characteristics which permit of its being readily handled for shipment. That is to say, it is proposed to construct the machine in such a way that the receptacle and its mounting may be readily shipped separately and then set up for use, thereby facilitating the shipment or transportation of machines of large capacity.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:

Figure 4 is a detail elevation of the cover illustrating the manner in which the same is rotatably supported on the receptacle.

Figure 5 is a detail view of the outlet valve.

Figure 6 is a detail view of the cam track for operating the valve.

Similar reference characters designate corresponding parts throughout the several figures of the drawings.

In carrying the present invention into effect it is proposed to provide a receptacle designated generally as A, having a base B mounted upon a pedestal or stand B'. The top of the receptacle is closed by a novel hinged sectional cover C and the interior of the receptacle is divided into a plurality of tanks, compartments, or holders D each having a separate outlet E controlled by a novel automatic valve device F which is adapted to empty or discharge into a receiver G.

Figure 3:
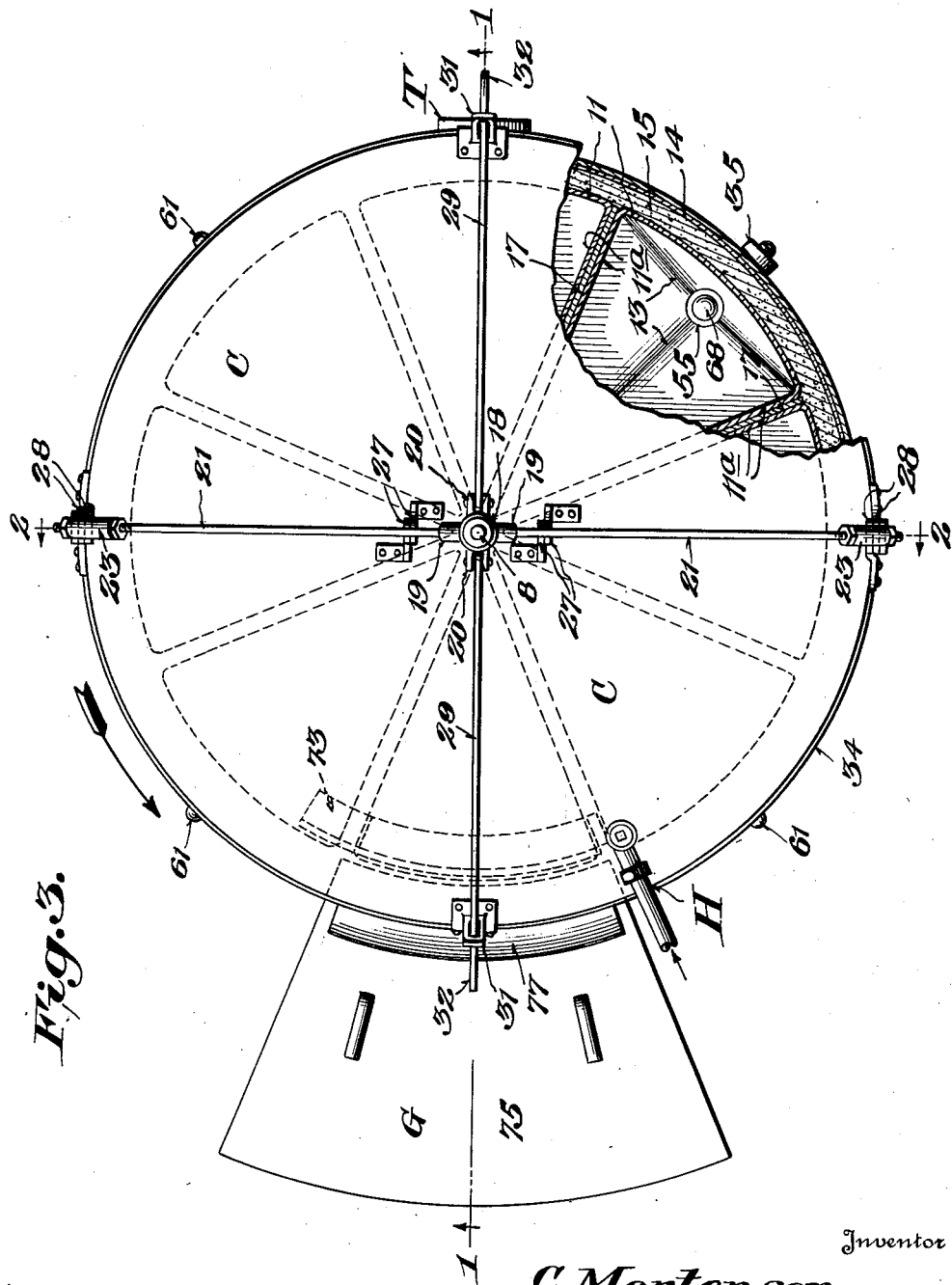
Figure 3 is a top plan view of the construction shown in Figure 1, the same being partly broken away to illustrate special structural features.

As will be observed from Fig. 3 the individual holders D are eight in number and the speed of rotation of the receptacle beneath the filling or supply pipe H is such that it will take five minutes for each one of the holders to pass beneath the supply pipe to receive its increment of milk and five minutes for each holder to drain, thereby leaving an intermediate Pasteurizing period of thirty minutes between receiving and discharging during which the milk is being properly Pasteurized at approximately 145°. Thus, the receptacle A makes one revolution in forty minutes and successively brings the outlet valves F of the individual holders D to the receiver G prior to delivering the milk to the cooler.

The cover C is provided with a fluid inlet connection H for delivering milk to the various compartments, and as the cover remains stationary while the receptacle rotates, it will be seen from Fig. 3 that the inlet H is located relatively close to the position of the receiver G so that as the receptacle rotates in the direction of the arrow in that figure, the holder D which has just emptied into the receiver G will next come under the position of the inlet thereby to receive its new supply of milk. After the holder is supplied with milk it will continue moving in the direction of the arrow thereby holding the milk for a period of thirty minutes before the outlet valve F of that holder is automatically operated at the discharging or emptying station. It will also be observed that the receiver G is always positioned with reference to the unit being filled so that any discharge or leakage of liquid from the said unit being filled will not drop into the receiver. In other words any leakage or drip from the outlet valves F will go to waste rather than drop in the receiver G thereby preventing the mingling of improperly treated milk with the milk in the receiver G. As will be observed from the drawing the opening in the receiver G for receiving discharge from the outlet valves of the individual holders represents an arc equal to or less than the arc of one of the sector shaped holders D.

Figure 1:
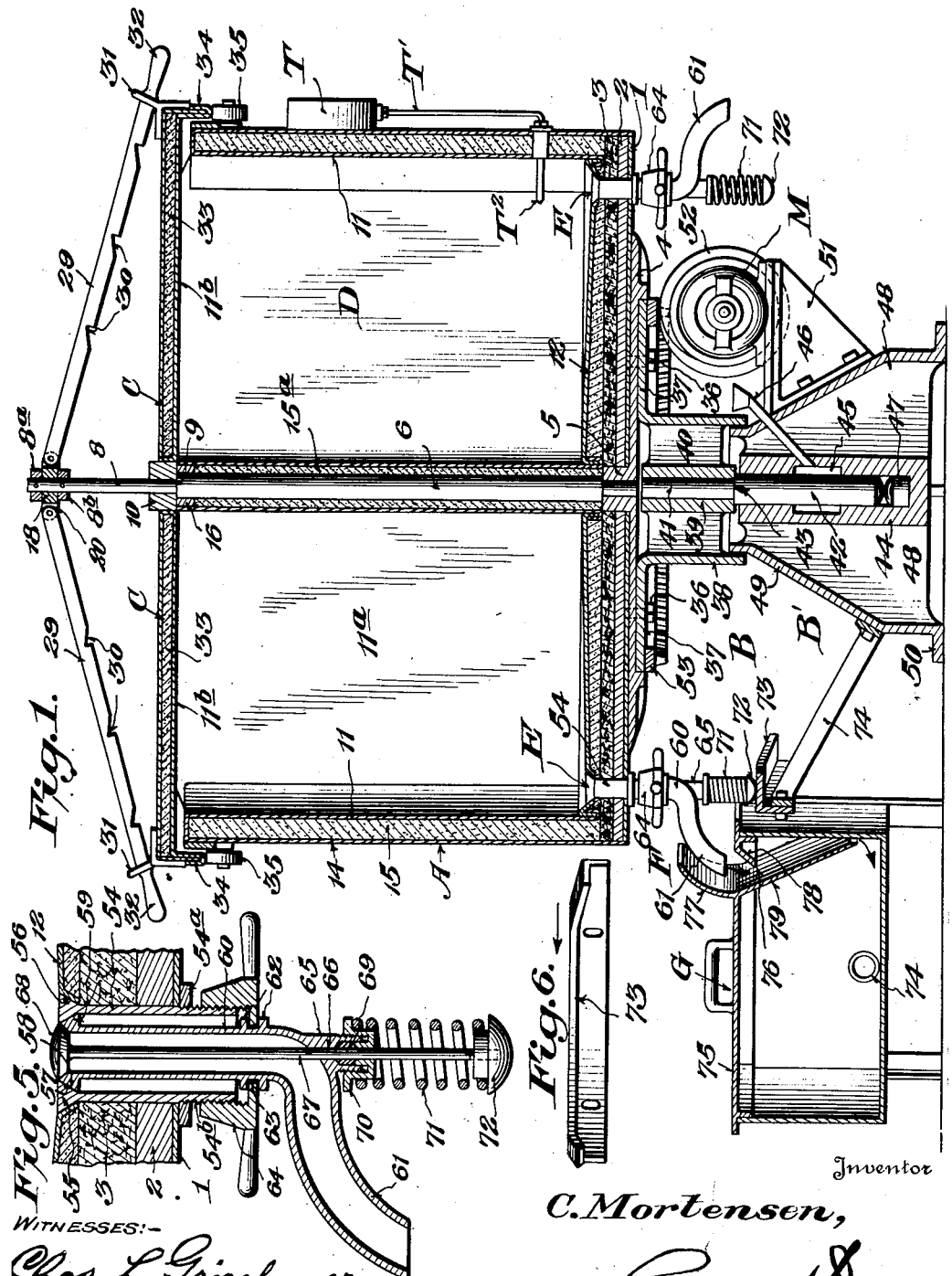
Figure 1 is a vertical sectional view of the apparatus embodying the present invention.
Figure 2:
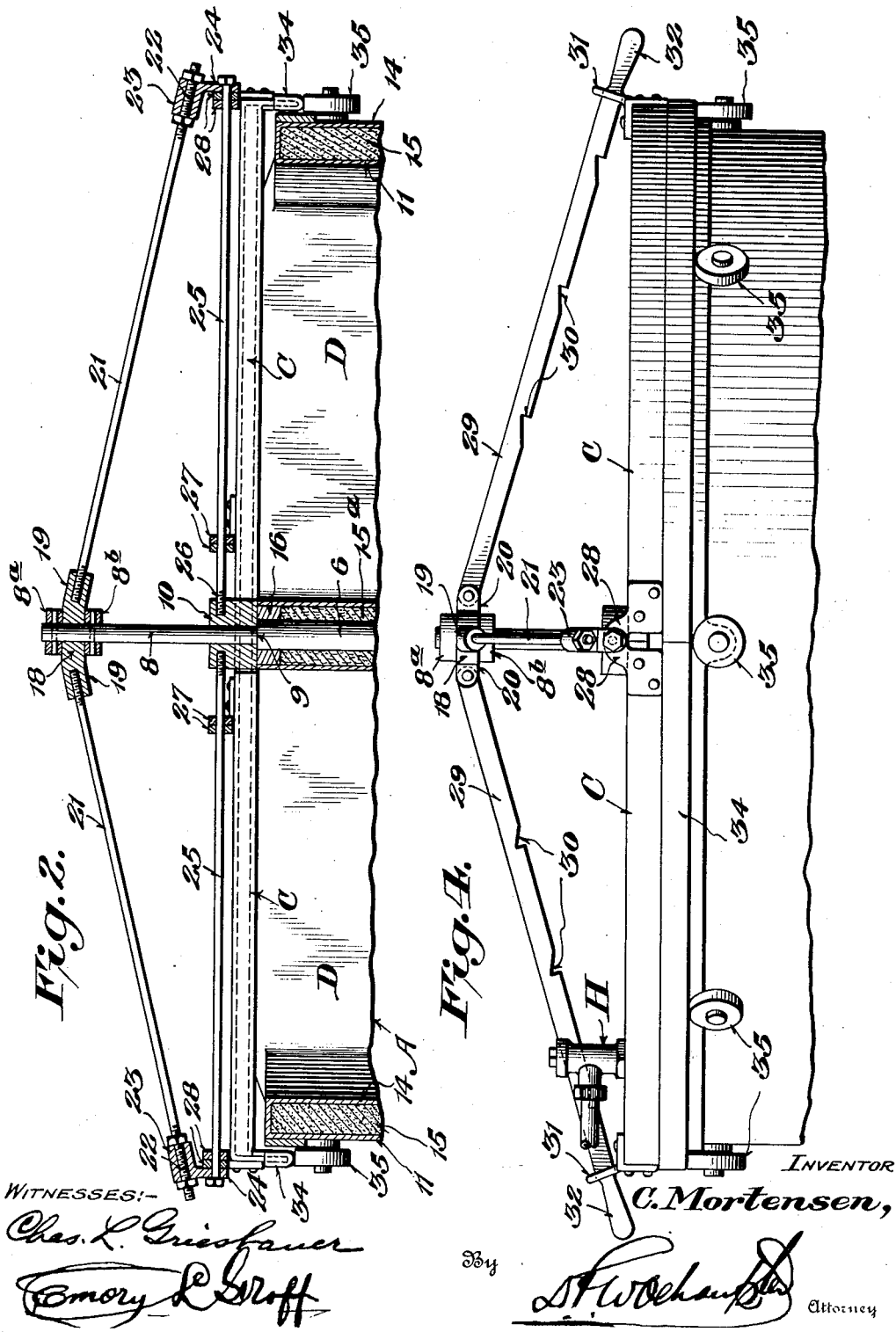
Figure 2 is a detail sectional view of the upper portion of the receptacle illustrating the means for hinging the cover, the line of section being taken at right angles to the section of Figure 1.

Referring now more particularly to the structural features and characteristics of the receptacle A it will be observed from Fig. 1 that the said receptacle preferably includes a bottom comprising a steel plate 1, and superposed layers of wood and cork respectively designated as 2 and 3, the same being mounted upon a base plate or spider 4 having a single hub portion 5 provided with a socket for receiving a central standard 6 which extends upwardly and is provided with a reduced end portion 8 thereby to provide a shoulder 9 for supporting the collar 10 of the cover assembly, as will hereinafter more fully appear. Arranged about the standard 6, and supported on the layer of cork 3, are the individual tanks or holders D, each of which preferably comprise the end walls 11 and side walls 11ᵃ and bottoms 12 which are seamed together in the manner shown thereby providing a hollow space in the bottom of the holders which is filled with asphalt or other suitable medium which may be flowed into the cavity provided by the seamed construction. The bottom 12 of the individual holders are preferably formed with draining valleys 13 as indicated in Fig. 3 which communicate with the outlets E controlled by the valve devices F which will presently be described more in detail. The outside walls of the tanks or holders D are surrounded by an outer casing 14 which is spaced from the tanks thereby to provide room for receiving suitable insulation 15, and likewise the space between the inside corners of the tanks and the standard 6 is also filled with insulation 15ᵃ which is put into place before the ring 16 is soldered or otherwise secured to the upper inside corners of the tanks forming the holders D. Between the adjacent side walls 11ᵃ of the tanks constituting the holders D there is preferably provided a metal plate 17 as shown in Fig. 3 for the purpose of strengthening and stiffening the side walls of the retainer and also permit the heat of the adjacent chambers to remain substantially uniform by conduction the main insulation required being that to maintain the heat of the milk contained in all of the units by insulating the entire outside casing which surrounds the tanks.

One of the novel and distinctive features of the receptacle A resides in continuing the side walls 11ᵃ of the individual holders upwardly above the level of the outside edge of the end wall 11 as indicated at 11ᵇ so that in case the machine stops or ceases to rotate for any reason milk will not flow from one compartment into the other but will flow over the outside of the casing and pass to waste, the cover C having a relatively loose fit at the edges of the receptacle for that purpose. This is an important feature in a machine of this character which requires the utmost safeguarding against accident to insure proper Pasteurization of the milk under all conditions of use. In a machine of this character it is necessary to make the same so nearly absolutely fool-proof that it will always work with the greatest accuracy and with the minimum attention, and that is one of the primary objects of the present construction.

Referring further to the standard 6 which rotates with the receptacle and has the upwardly projecting spindle portion 8 it will be observed from Figures 1 to 4 that the said spindle portion is provided with the bearing collars 8ª and 8ᵇ which receive therebetween a spider casting 18 that is provided with the diametrically opposite screw-threaded sockets 19—19 and also with the diametrically opposite pivot ears 20—20. The threaded sockets 19—19 are adapted to receive the supporting rods 21 whose outer ends are attached as indicated at 22 to the brackets 23 which carry the outer ends 24 of the hinge rods 25 for the cover C. This cover is diametrically divided into opposing halves or sections which are pivoted or hinged on the rod 25 whose end 26 is threaded or otherwise fitted into the collar 10 which rests on the shoulder 9 of the standard 6 as previously described. As will be seen from Figs. 2 and 3 the opposite sections or halves of the cover C are provided with the complemental hinge eyes 27 and 28 respectively located near the center and peripheral edge of the cover thereby to pivotally support the opposite sections of the cover on the hinge rods 25.

For the purpose of holding the cover sections elevated the ears 20 pivotally receive the bars 29 which are notched as indicated at 30 on their under sides thereby to receive the inner corner of the loop or eye 31 mounted on the outer edge of the cover. When it is desired to raise a section of the cover it is simply necessary to lift the bars 29 by means of their handles 32 and thereby lift the cover section so as to bring the inside corner of member 31 into one of the keeper notches 30.

The cover C is preferably made of metal and contains interior insulation 33 as shown in Fig. 1, and the top and bottom portions thereof are flanged together as indicated at 34 thereby to provide a flanged rim which loosely fits the outside casing 14 of the receptacle and whose lower edge is adapted to ride on rollers 35 suitably mounted at spaced intervals adjacent the upper edge of the receptacle 14, thereby to permit the receptacle to rotate freely under the cover C.

As previously indicated, it is one of the features of the invention to make the present apparatus in sections which can be readily handled, and to that end the base B is readily separable from the receptacle A as may be readily observed from Figure 1. That is to say, the spider or base plate 4 is adapted to have detachably fitted thereto by the bolts 36 or their equivalent the upper flange portion 37 of the base casting B which includes the outer rim portion 38 that is connected to an inner central hub 39 by means of the webs 40. This hub 39 receives the upper end 41 of a bearing shaft 42 which is of larger diameter than the said upper end 41, thereby to provide a shoulder 43 upon which the lower end of the hub 39 rests. The said end 42 of the shaft is journaled in a central bearing post 44 which is interiorly recessed as indicated at 45 to provide an oil chamber which may be filled with light oil through the filling spout 46. The lower end of the shaft 42 is flat and bears upon a pair of case hardened steel buttons 47 as clearly shown in Figure 1, thereby providing a substantially anti-frictional support for the receptacle.

The post 44 is carried by the webs 48 of the base mounting or stand B' which preferably has the conical wall portions 49 and the supporting ring 50 which rests upon the floor or other surface. This mounting or stand B' carries therewith a motor supporting bracket 51 upon which a suitable motor M is mounted, the same driving one or more sets of reduction gearing, thereby to drive a spiral propeller wheel 52 which meshes with a rack 53 carried by the underside of the flange 37 of the base B. In connection with the rack 53 it is important to note that the same is made in sections and that the teeth of the rack are in the form of rounded or substantially conical pegs which are engaged by the spiral wheel 52 thereby to slowly rotate the receptacle A. It is pointed out that the peg type of rack-tooth is essential because it is impossible to make a worm drive a circular worm rack from a position below the rack.

The individual holders D of the receptacle A have the discharge outlets E which are controlled by the outlet valves F which are shown more in detail in Figure 5 from which it will be observed that the said valve device comprises a tubular sleeve member 54 having at its upper end the enlarged ring portion 55 whose outer inclined face 56 bears against a corresponding inclined seat forming the outlet E while the inclined face 57 forms an abutment for a mating face 58 formed on the enlarged head portion 59 of an outlet angular tube 60 one portion of which extends upwardly through the sleeve 54 while the other portion provides the spout portion 61 for discharging into the recess G. In connection with the sleeve 54 it will be observed that the same is locked to the bottom of the holder by means of the lock ring 54ª which engages with the threaded portion 54ᵇ of the sleeve 54. Also it will be noted that the outlet tube 60 is provided with the spaced rings 62 which receive therebetween the flange 63 of a hand-nut 64, the hollow interior portion of which is threaded to also engage with the threads 54ᵇ on the sleeve 54. With the arrangement described it will be apparent that when the hand-nut 64 is manipulated that the outlet tube 60 will be forced upwardly thereby to bind the surfaces 57 and 58 together and provide a fluid tight joint between the two and the surface.

As will also be seen from Figure 5 the outlet tube 60 is provided substantially at the junction of its angular portions with a boss 65 which is provided with a central bore 66 for receiving the stem 67 of the valve 68 which seats in the ring 59 formed at the inlet end of the outlet tube 60. The boss 65 is provided with a suitable packing gland structure 69, the flange 70 of one of the members of the gland providing an abutment for a spring 71 which bears against the inside face of the knob 72 detachably carried by the lower end of the valve stem 67. The spring 71 forces the valve stem 67 downwardly thereby to hold the valve 68 closed and also maintains the knob 72 in position to engage with a lifting cam 73 adjustably carried by a bracket 74, which is also carried by the inclined wall 49 of the stand B'. As will be observed from Figure 3 the cam 73 is arranged to lift the valve 68 as soon as the sprout 61 of the valve F on the holder about to discharge reaches the approach side of the receiver G. After the knob 72 has traversed the proper distance on the cam 73 the valve 68 is abruptly closed so that the holder which has just emptied has its outlet valve closed as it passes to a position beneath the filling inlet H on the cover, thereby to receive the next supply of milk to be held for the Pasteurizing period. As the milk flows continuously from the inlet connection H into the tanks as they pass beneath the same in succession it will be apparent that no valve or cut off is required in the milk supply line. The timing is such that each holder will require five minutes to pass beneath the inlet and as it passes beyond the same the milk therein will be held for a period of thirty minutes before even the first drop is allowed to escape. After the thirty minute period the valve 68 will be lifted due to the knob 72 engaging with the cam 73 whereupon the spout 61 of the outlet valve F will discharge for five minutes after it passes over the receiver G.

The construction of the valve device F is of special importance because it permits of readily being taken down for sterilizing purposes. That is to say, by removing the knob 72 the valve 68 may be readily withdrawn and by manipulating the hand-nut 64 the outlet tube 60 may be readily separated from the sleeve 54, and when it is desired to replace the valves, they may be assembled with the same facility that they were taken apart.

The receiver G is preferably a tank having an outlet 74 and a cover 75 provided with a milk receiving opening 76 for receiving discharge from the spouts 61 of the valves F. The opening 76 has fitted to one side thereof an upwardly extending curved guard 77 and at the opposite side thereof is provided with a downwardly inclined lip 78 while the interior of the cover is provided with a downwardly extending anti-splash plate 79 against which the milk is projected in such a manner as to prevent foaming or unnecessary churning or agitation of the milk.

For the purpose of checking the temperature of milk contained within the receptacle A a suitable thermostat device designated generally as T is employed. This thermostat is preferably of the recording type and is mounted on the outside of the casing A as shown in Figure 1, and is connected by means of the tubing T' with the thermal element T² which projects through the wall of the casing into one of the holders D. The object in having a thermostat T is to check the operation of the machine throughout its cycle. The recording chart of the present apparatus shows that the milk in the holder to which the thermostat is attached remains within a degree of 145° throughout the cycle, and the graph line only drops when the holder in which the thermostat is placed is emptied. However, the graph line immediately returns upon the holder being filled.

From the foregoing it will be apparent that the novel and distinctive features of the present invention include a receptacle having a plurality of compartments whose partition walls are higher than the outside walls thereby to prevent overflowing from one compartment to the other, while a novel sectional hinged cover is provided for the receptacle, the same being held stationary while the receptacle rotates. Also, the feature of mounting the receptacle on a detachable base plate which in turn may be mounted on a suitable stand facilitates the transportation and assembly of the device while the novel automatic discharge valves provide means for keeping the outlet valve sanitary by proper sterilization.

It is also pointed out that the receiver G is so arranged as to avoid receiving drip or leakage from the compartment being filled while the cam for operating the outlet valves is mounted in a stationary position on the stand which supports the casing.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In a milk Pasteurizing apparatus, a receptacle having a plurality of individual compartments, and the walls dividing said compartments being of greater height than the outside edge of the receptacle.

2. In a milk Pasteurizing apparatus, a receptacle, means for dividing said receptacle into a plurality of individual holding compartments, said means projecting above the outer edge of the receptacle.

3. In a milk Pasteurizing apparatus, a receptacle, consisting of an insulated outer wall, and a plurality of partition elements of greater height than said outer wall and dividing the receptacle into a plurality of noncommunicating holding compartments, whereby overfilling of any compartment will flow over the edge of the receptacle instead of into an adjacent compartment.

4. In a milk Pasteurizing apparatus, a receptacle, consisting of an insulated outer wall, and a plurality of partition elements of greater height than said outer wall and dividing the receptacle into a plurality of noncommunicating holding compartments, said partition being of noninsulating material.

5. In a milk Pasteurizing apparatus, a receptacle having insulated side and bottom walls, a plurality of individual tanks arranged within the receptacle thereby providing a plurality of milk holding compartments, the adjacent walls of said tanks being separated by a stiffening plate, and said walls and said plates extending above the level of the outside insulated wall of the receptacle.

6. In a milk Pasteurizing apparatus comprising a rotatably mounted receptacle, a plurality of individual holding tanks arranged within the receptacle and the dividing walls between adjacent tanks being continued above the level of the outside wall of the receptacle, a stationary cover having a relatively loose fit on said receptacle, and a milk supply inlet connection carried by said cover.

7. A milk Pasteurizing apparatus comprising a receptacle, a plurality of individual holding compartments formed within the container and each having a separate valved outlet, a cover for said receptacle, a supply connection associated with the cover for continuously supplying milk to the holders, means for rotating the receptacle, and means whereby overflow from one compartment to the other is prevented if the receptacle is caused to cease its rotation.

8. A milk Pasteurizing apparatus comprising a receptacle having a plurality of individual compartments each provided with separate valved discharge outlets, and the partition walls of said compartments being higher than the outside walls thereby to prevent overflow from one compartment to the other, a cover for said receptacle, a milk supply pipe connected to said cover for continuously supplying milk to the holders, and means for rotating the receptacle beneath the cover.

9. A milk Pasteurizing apparatus, a rotatably mounted receptacle having a plurality of individual holding compartments therein, a separate valved discharge outlet for each compartment, a stationary cover having a rolling contacting engagement with the receptacle, a filling inlet carried by the cover for continuously supplying milk to the holding compartments successively as the receptacle rotates, and means for singly and successively operating the said discharge outlet valves.

10. In a milk Pasteurizing apparatus, a rotary receptacle having a plurality of holding compartments, and a cover for said receptacle, said cover comprising hinged sections.

11. In a milk Pasteurizing apparatus, a rotary holding receptacle, a plurality of rollers arranged on the outside of the receptacle adjacent the upper edge thereof, and a cover for said receptacle having means resting on said rollers whereby the cover may remain stationary while the receptacle rotates therebeneath.

12. In a milk Pasteurizing apparatus, a rotary holding receptacle, a cover for said receptacle, and cover supporting means carried by the receptacle whereby the latter may rotate freely beneath the cover.

13. In a milk Pasteurizing apparatus, a rotary holding receptacle, cover supporting means carried by the outerside of the receptacle, cover supporting means carried at the central portion of the receptacle, and means for lifting said cover and maintaining the same in raised position with reference to the receptacle.

14. In a milk Pasteurizing apparatus comprising a rotary receptacle, a relatively stationary cover, means on the receptacle having a traveling engagement with a portion of the cover, and said cover being formed in sections hinged diametrically of the cover, and means for holding either of said sections raised independently of the other.

15. In a milk Pasteurizing apparatus, a rotary receptacle, a sectional cover therefor, a flange at the periphery of said cover, means on the outside of the receptacle for supporting the flange of the cover whereby the receptacle may rotate with reference to the cover.

16. In a milk Pasteurizing apparatus, a rotary receptacle, a sectional cover therefor, a flange at the periphery of said cover, means on the outside of the receptacle for supporting the flange of the cover whereby the receptacle may rotate with reference to the cover, a central cover supporting spindle and a collar loosely mounted on said spindle, hinge rods carried by the collar and pivotally connecting the sections of the cover, stay rods for supporting and connecting the outer end of the hinge rods with the central spindle, and means also connected with the central spindle for raising and maintaining the cover sections in elevated position.

17. In a milk Pasteurizing apparatus, a receptacle including an insulated outside wall and an insulated bottom wall, said bottom wall comprising a metallic bottom plate and superposed layers of insulation, and a plurality of tanks formed by radially disposed walls made of non-insulating material thereby dividing the receptacle into a plurality of holding compartments.

18. In a milk Pasteurizing apparatus including a receptacle containing a plurality of interior holding compartments, a base member detachably fitted to the bottom of said receptacle and comprising a horizontally disposed base flange for engaging with and supporting the said receptacle and a hub portion having a vertical bearing opening, a stand, a bearing post journaled in the stand and having its upper portion journaled in the said vertical bearing opening, and driving means engaging with said base member for rotating the receptacle supported thereon.

19. In a milk Pasteurizing apparatus, a holding receptacle having a plurality of individual holding compartments, an outlet valve for each compartment, means for rotatably supporting the receptacle, a receiver located at a discharging station for said individual compartments, and means supported independently of the receiver for automatically actuating the outlet valves when they reach the discharging station.

20. In a milk Pasteurizing apparatus, a receptacle having a plurality of individual compartments, separate automatic outlet valves for each compartment, means for rotatably supporting the receptacle including a base, a stand, means carried by the stand for rotating the base upon which the receptacle rests, a receiver, and cam means carried by the stand and adapted to actuate the outlet valve when it reaches the position of the receiver.

21. In a milk Pasteurizing apparatus, a stand, a receptacle rotatably supported on said stand, and having a plurality of individual holding compartments, a separate automatic outlet valve for each compartment, a receiver, and cam means carried by the stand for operating the automatic outlet valves as they reach the position of the receiver.

22. In a milk Pasteurizing apparatus, a receptacle having a plurality of individual compartments, a separate outlet valve for each compartment, each valve comprising a tubular member detachably held in the bottom of the compartment, a discharge tube having an offset spout portion at one end and a valve seat at its inlet end, manually manipulated means for separably holding the discharge tube in the said tubular member, a valve adapted to fit in said valve seat of the discharge tube and having a stem projecting exteriorly of the tube, a spring for maintaining said valve seated, and cam means for unseating the valve against the tension of the spring.

23. In a milk Pasteurizing apparatus, a receptacle having a plurality of non-communicating holding compartments each provided with a separate outlet valve device, said outlet valve device comprising a sleeve detachably engaging with the bottom of the receptacle, a discharge tube detachable arranged within the sleeve, and a valve in the discharge tube portion having an exteriorly projecting stem, and means for engaging said stem to operate the valve.

24. In a milk Pasteurizing apparatus, a rotary holding receptacle having a plurality of holding compartments, a separate outlet valve for each compartment, said valve comprising a sleeve detachably engaging with the bottom of the receptacle, a discharge tube detachably engaging with the sleeve, a valve member including a stem portion projecting exteriorly of the discharge tube, and a detachable head carried by the valve stem.

25. In a milk Pasteurizing apparatus, a rotary receptacle having a plurality of individual holding compartments, separate outlet valves for the compartments, a receiver, means located at the position of the receiver for automatically operating said valves, and said receiver comprising an inclined wall adapted to receive discharge from the outlet valves whereby to convey the milk into the receiver without foaming.

26. In a milk Pasteurizing apparatus, a rotary receptacle having holding compartments, outlet valves for said compartments, a receiver adapted to receive milk discharged from said outlet valves, and said receiver including a covering having an upstanding guard wall and an interior downwardly inclined wall for receiving discharge from said outlet valves thereby to prevent foaming and churning of the milk in the receiver.

27. In a milk Pasteurizing apparatus, a rotary receptacle having holding compartments, outlet means for said compartments, a receiver spaced from the point of discharge of the said means and adapted to receive milk therefrom, and said receiver including means disposed in the path of the milk discharged from said valves to prevent foaming and churning of the milk in the receiver.

In testimony whereof I hereunto affix my signature.

CORNELIUS MORTENSEN.